Dec. 25, 1951   A. E. NAVE   2,579,848
BUTTER CONDITIONER

Filed Sept. 17, 1949   2 SHEETS—SHEET 1

INVENTOR.
ALFRED E. NAVE
BY
Alden D. Redfield
Robert L. Spencer
ATTORNEYS

Dec. 25, 1951 A. E. NAVE 2,579,848
BUTTER CONDITIONER
Filed Sept. 17, 1949 2 SHEETS—SHEET 2

INVENTOR.
ALFRED E. NAVE
BY
Alden D. Redfield
Robert L. Spencer
ATTORNEYS

Patented Dec. 25, 1951

2,579,848

UNITED STATES PATENT OFFICE 2,579,848

BUTTER CONDITIONER

Alfred E. Nave, Cincinnati, Ohio, assignor to Avco Manufacturing Corporation, Cincinnati, Ohio, a corporation of Delaware Application September 17, 1949, Serial No. 116,289

5 Claims. (Cl. 62—2)

This invention relates to refrigerator cabinets and more particularly to a novel auxiliary compartment within such a cabinet for the storage of butter and similar foodstuffs which are to be maintained at a higher temperature than the articles stored in the cabinet proper.

It has heretofore been proposed to provide auxiliary food storage receptacles for storing butter or the like at a temperature which will permit easy spreading of butter. Such compartments have, however, been permanently incorporated in the refrigerator cabinet and have been difficult to clean.

An object of this invention is to provide a new and improved food storage receptacle for storing butter or the like which may quickly and easily be removed from the refrigerator cabinet for the purpose of cleaning.

A further object of this invention is to provide an auxiliary food storage receptacle housing formed of two sections, one of which is adapted to be moved with respect to the other to provide access to the interior of the compartment while the other is adapted to retain food stored therein without spillage due to relative movement of the two sections.

Further objects and advantages of this invention will be apparent from the following description and claims, together with the accompanying drawings forming a part of this application, in which:

Figure 1:
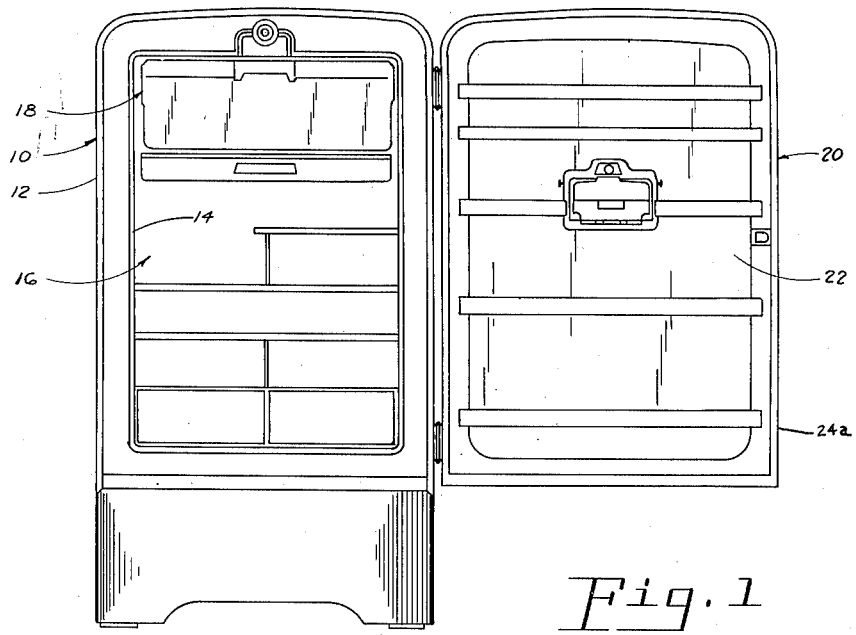
Fig. 1 is a front view of a refrigerator cabinet embodying an auxiliary food storage compartment constructed in accordance with the principle of this invention.
Figure 2:
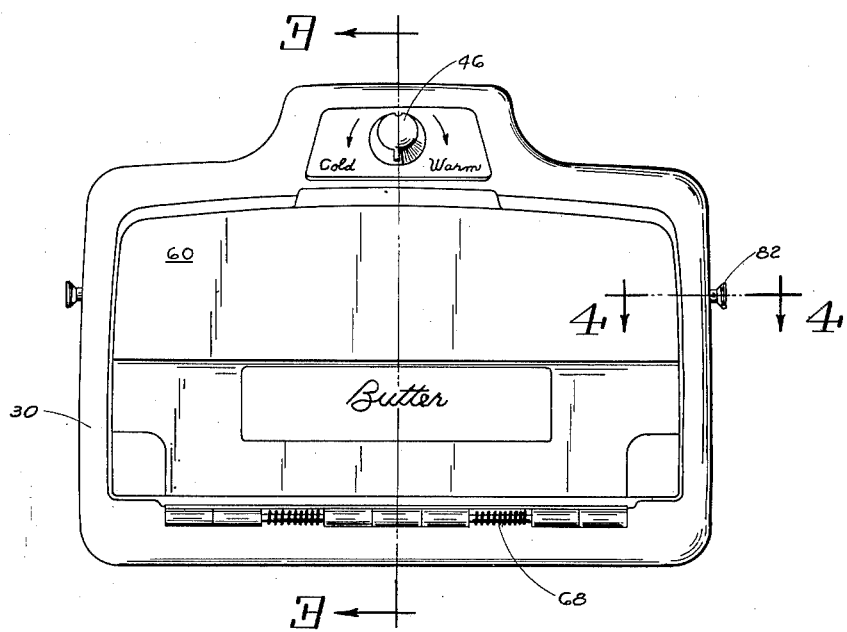
Fig. 2 is an enlarged view of the butter conditioner illustrated in Fig. 1.

Referring to the drawings, and particularly to Fig. 1, there is shown a refrigerator cabinet 10 having an outer shell 12 and an inner lining 14 spaced from shell 12 enclosing a main refrigerated food storage compartment 16. Compartment 16 may be refrigerated in any suitable manner as by means of an evaporator 18. A door 20 forms a movable wall for providing access to compartment 16.

Door 20 is formed of an inner liner 22 and an outer shell 24a spaced from the liner with insulation therebetween. As shown particularly in Fig. 3, liner 22 is provided with an opening 24 adapted to receive a support housing indicated generally at 26, the base of which extends through the opening into the interior of the door. Support plate 26, which is preferably formed of stainless steel, or other material having good heat conducting properties, comprises a generally dish-shaped portion 28 which extends from without the door into the interior of the door and a rim 30 extending entirely around portion 28. Rim 30 overlaps opening 24 entirely around the opening and includes an apron 32 which contacts the door liner entirely around the opening to limit heat flow into the cabinet through opening 24. At the inner edge of the apron at each side of the support plate there is provided an L-shaped bracket 34 for fastening the support plate to the liner. The bracket may be welded to the inner side of apron 32 and secured to liner 22 by means of a screw extending through the liner and into the bracket.

Figure 3:
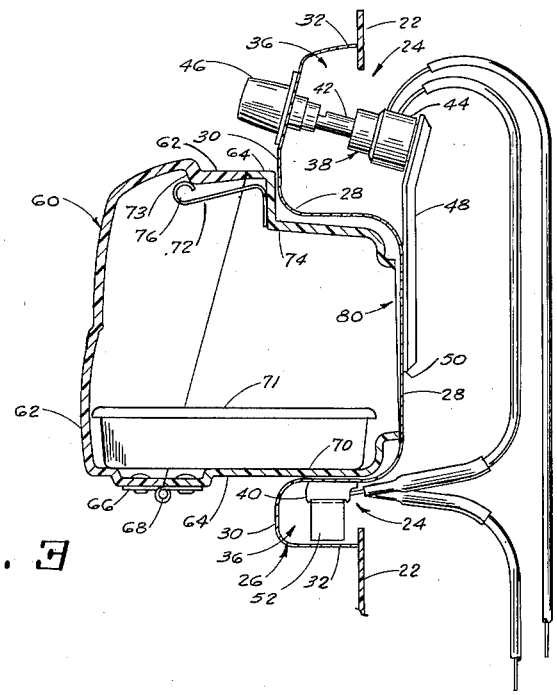
Fig. 3 is a partially sectional view taken along the line 3—3 of Fig. 2.
Figure 4:
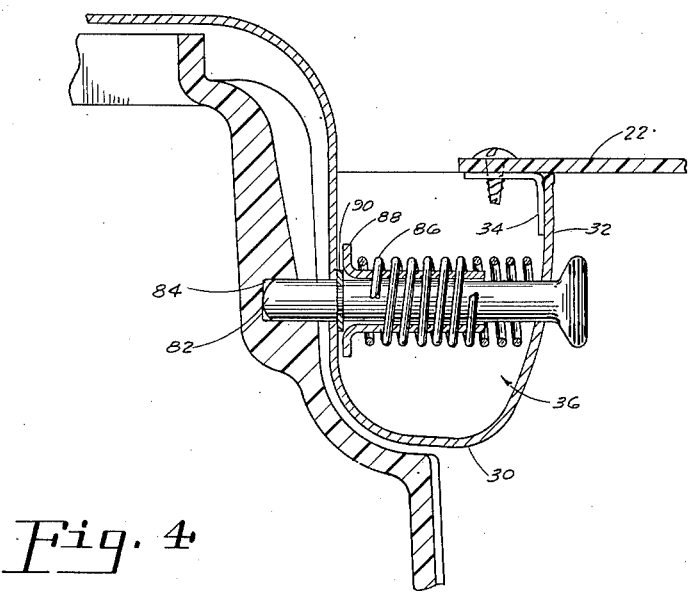
Fig. 4 is an enlarged sectional view taken along the line 4—4 of Fig. 2.

As shown in Figs. 3 and 4, rim 30 and apron 32 enclose a chamber 36 extending entirely around the dished portion 28 of the support plate, which chamber is adapted to house a thermostat control mechanism 38 at the top and an electric heater element 40, which may be a resistor, at the bottom of the support plate. The thermostat control mechanism 38 includes a rotatable shaft 42 adapted to regulate a thermostat 44 to maintain desirable temperatures within the auxiliary compartment. The shaft 42 extends through the support plate 26 and is provided with a control knob 46, as shown. A thermostat mounting bracket 48 is mounted on the inner side of the mounting plate to retain a bi-metallic control element 50 in thermal contact with the support plate rearwardly of a housing, hereafter more fully described, so that the thermostat is responsive to temperatures maintained in the housing. Heater element 40 is disposed in chamber 36 at the bottom of the support plate and is spaced from apron 32 and in thermal contact with support plate to insure good heat transfer through the plate. The heater element is of generally rectangular configuration having a U-shaped groove on one side so that the heater may be quickly and easily assembled by merely inserting the heater between the bottom of the support plate and a pair of spaced generally U-shaped spring retainers 52. One side wall of the spring retainer extends into the U-channel and the other is secured to apron 32 so that the heater element is forcibly retained in contact with the under-surface of the support plate. Since the heater is spaced from the apron, heat loss into the cabinet proper is minimized. Suitable wiring connects the heating element to the thermostat and the thermostat, in turn, to a source of current.

A housing 60, which is preferably formed of moulded plastic, is provided to enclose the auxiliary food storage compartment. The housing is formed of front and rear sections 62 and 64, respectively, connected together by means of a hinge 66 on the bottom of the housing. A spring 68 acts to normally maintain the two sections of the housing in closed relationship. As shown in Fig. 3, rear section 64 presents a bottom surface 70 of sufficient depth to support a tray 71 when section 62 is swung about the horizontal axis presented by hinge 66 to provide access to the interior of the auxiliary compartment. A spring clip 72 at the top of the housing cooperates with a ledge 73 on section 62 of the housing to retain the two sections of the housing in closed relationship to insure a minimum of heat leakage through the contacting surfaces of the two housing sections. As shown, the spring clip is secured to a downwardly extending flange 74 on the rear section, is spaced from the upper surface of the rear section and extends outwardly into the front section beyond the rear section of the housing. A turned up circular contact member 76 is provided on one end of the spring clip, which member cooperates with flange 73 on the front section of the housing to yieldably retain the two sections of the housing in physical contact. An opening 80 is provided in the rear wall of section 64 so that the support plate rearwardly of the housing is maintained at substantially the same temperature as that within the auxiliary compartment. Thus, the thermostat 38, while being positioned externally of the auxiliary compartment is responsive to the temperature in the compartment.

The housing 60 is mounted on support plate 26 so as to be quickly and easily removed therefrom for the purpose of cleaning. In Fig. 4, there is shown one of two similar retaining means for holding the housing and support plate in assembled relationship.

A pin 82 extends through apron 32 and the side wall of the support plate into a slot 84 formed on the side wall of section 64 of the housing. A spring 86 disposed around the release pin 82, cooperates with the inner surface of apron 32 and a release pin collar or sleeve 88 extending over the pin to normally urge the sleeve toward the side wall of the support plate. A C-type washer 90 extends into a groove on pin 82 so that the sleeve normally urges the pin into slot 84 on the housing. It will, of course, be understood that similar pin arrangements are utilized at each side of the housing to retain the housing upon the support plate.

By this invention there has been provided a novel auxiliary compartment adapted to be mounted upon a wall of a refrigerator, to be quickly and easily removable therefrom, and to be maintained at a temperature higher than that in the cabinet proper. All of the electrical elements for maintaining the desired temperature in the auxiliary compartment and the fastening means for removably mounting the housing on the support plate are hidden from view and are positioned to minimize heat leakage into the cabinet proper. The housing forming the auxiliary compartment is free of any electrical elements and may be quickly and easily removed for washing and re-positioned upon a wall of the cabinet.

While the housing has been illustrated as being mounted upon the inner liner of a refrigerator door, it will be readily understood that it may also be positioned upon any one of the walls of the cabinet.

What is claimed is:

1. A refrigerator cabinet comprising a main refrigerated food storage compartment, a housing enclosing an auxiliary food storage compartment in said cabinet, a support plate for supporting said housing in said cabinet, an opening in one wall of said housing disposed adjacent said support plate in assembled relationship, a thermostat disposed in thermal contact with said support plate on the side thereof opposite said housing opening and adjacent thereto, a heating element operatively connected to said thermostat disposed in thermal contact with said support plate for heating said auxiliary food storage compartment, and a spring loaded fastener mounted on said support plate for removably retaining said housing and support plate in assembled relationship.

2. In a refrigerator cabinet having a main refrigerated food storage compartment, a support plate mounted upon a wall of said compartment, a housing enclosing an auxiliary food storage compartment, said housing being split into front and rear sections movable with respect to each other, a hinge joining said sections whereby said front section may be rotated about a horizontal axis to provide access to the interior of said auxiliary compartment, a latch for releasably retaining said sections in closed relationship with respect to each other, a pin mounted on said support plate for releasably retaining said housing and support plate in assembled relationship, an opening in one wall of said housing disposed adjacent said support plate in assembled relationship, a thermostat disposed in thermal contact with said support plate adjacent said opening, an electric heating element operatively connected to said thermostat in thermal contact with said support plate beneath said housing for heating said auxiliary food storage compartment.

3. In a refrigerator cabinet having a main refrigerated food storage compartment which is accessible through a door hingedly secured thereto, a concaved support plate secured to the inner face of the door with its concavity facing the interior of the main food storage compartment, a removable housing split vertically into front and rear sections movable with respect to each other, a hinge joining said sections whereby said front section may be rotated about a horizontal axis to provide access to the interior of the rear section, a latch for releasably retaining said sections in closed relationship with respect to each other, the rear section of said compartment engaging said support plate along a portion of its bottom wall, a pin mounted on said support plate for releasably retaining the rear section of said housing within the concavity of said support plate, an opening in the rear wall of said housing disposed adjacent the rear wall of the concavity of said support plate when in assembled relationship therewith, a thermostat disposed behind and in thermal communication with the rear wall of said support plate adjacent the housing opening, and an electric heating element operatively connected to said thermostat and in thermal contact with the underside of said support plate beneath the bottom wall of said housing where it contacts said support plate.

4. A refrigerator cabinet comprising a main refrigerated food storage compartment, a removable housing enclosing an auxiliary food storage compartment in said cabinet, a support plate attached to said cabinet for releasably supporting said housing, one wall of said housing being contiguous to said support plate, and a heating element disposed in thermal contact with said support plate adjacent the contiguous wall of said housing for heating said auxiliary food storage compartment.

5. A refrigerator cabinet comprising a main refrigerated food storage compartment, a removable housing enclosing an auxiliary food storage compartment in said cabinet, a support plate secured to said cabinet for releasably supporting said housing, an opening in one wall of said housing disposed adjacent said support plate when in assembled relationship therewith, a thermostat disposed in thermal contact with said support plate on the side thereof opposite said housing opening and adjacent thereto, and means for heating the interior of said housing, said thermostat being operatively connected for controlling the heat output of said heating means.

ALFRED E. NAVE.

REFERENCES CITED

The following references are of record in the file of this patent:

UNITED STATES PATENTS

| Number | Name | Date |
| --- | --- | --- |
| 2,253,971 | Dodge | Aug. 26, 1941 |
| 2,303,806 | Wild | Dec. 1, 1942 |
| 2,311,446 | Knight | Feb. 16, 1943 |
| 2,375,714 | Wild | May 8, 1945 |
| 2,378,816 | Wild | June 19, 1945 |